United States Patent [19]

Chiarabini Bravi

[11] Patent Number: 5,369,830
[45] Date of Patent: Dec. 6, 1994

[54] METHOD FOR MANUFACTURING SHOES AND SOLES THEREFOR

[75] Inventor: Dante Chiarabini Bravi, Barcelona, Spain

[73] Assignee: The DC Company Spain, S.A., Barcelona, Spain

[21] Appl. No.: 63,525

[22] Filed: May 19, 1993

Related U.S. Application Data

[63] Continuation of PCT/ES92/00025, Mar. 3, 1992.

[30] Foreign Application Priority Data

Aug. 16, 1991 [ES] Spain .................... 9101898

[51] Int. Cl.⁵ .................................... A43B 13/04
[52] U.S. Cl. ............................ 12/146 BR; 36/32 A
[58] Field of Search ............. 36/32 A, 30 R, 28, 114, 36/76 R, 12, 18, 19 R, 12, 22 R, 22 A; 12/142 R, 142 C, 142 RS, 142 T, 14 BR

[56] References Cited

U.S. PATENT DOCUMENTS

| | | | |
|---|---|---|---|
| 1,624,913 | 4/1927 | Ames | 36/32 A |
| 1,968,290 | 7/1934 | Gilkerson | 36/19 R |
| 1,968,291 | 7/1934 | Gilkerson | 36/19 R |
| 2,039,767 | 5/1936 | Bilodeau | 36/19 R |
| 2,489,027 | 11/1949 | Glassman | 12/142 C |
| 2,876,470 | 3/1959 | Ritter | 12/142 C |
| 4,043,058 | 8/1977 | Hollister et al. | 36/28 |
| 4,128,950 | 12/1978 | Bowerman et al. | 36/28 |
| 4,316,332 | 2/1982 | Giese et al. | 36/30 R |
| 4,463,505 | 8/1984 | Duclos | 36/30 |
| 4,854,057 | 8/1989 | Misevich et al. | 36/30 R |

FOREIGN PATENT DOCUMENTS

| | | | |
|---|---|---|---|
| 0142677 | 5/1985 | European Pat. Off. | |
| 589107 | 5/1925 | France | 36/32 A |
| 935251 | 6/1948 | France | |
| 967459 | 11/1950 | France | |
| 1016956 | 11/1952 | France | |
| 1610620 | 3/1953 | Germany | |
| 157783 | 9/1921 | United Kingdom | 36/32 A |
| 309319 | 4/1929 | United Kingdom | 36/32 A |
| 397669 | 8/1933 | United Kingdom | 36/32 A |

*Primary Examiner*—Steven N. Meyers
*Attorney, Agent, or Firm*—Brumbaugh, Graves, Donohue & Raymond

[57] ABSTRACT

The method for manufacturing shoe soles consists in cutting by half a tire and separating its flancs, reducing the interior portion of said flancs down to the cotton weaving, smoothing both faces of said flancs in order to homogenize the surface and to obtain an appropriate average thickness, punching the sole with its definitive form and fixing said form in a press. The shoe is fabricated by pressing a leather sole in a microporous inner sole, adhering said elements to each other by application of pressure, sewing to said elements the shoe upper, adhering a steel reinforcement to the microporous inner sole, adhering a microporous wedge to a tire outer sole by application of temperature and pressure, assembling together by sizing the leather upper, the leather sole, the microporous inner sole and the steel reinforcement with the assembly formed by the wedge and the tire outer sole, and trimming the contour of the outer sole. The invention applies to the fabrication of leisure and sport shoes.

2 Claims, 1 Drawing Sheet

METHOD FOR MANUFACTURING SHOES AND SOLES THEREFOR

This is a continuation-in-part application of international application No. PCT/ES92/00025, filed Mar. 3, 1992.

FIELD OF THE INVENTION

The present invention relates to the manufacture both of shoe soles and of the shoes themselves. In particular, the invention relates to a method for manufacturing an outer shoe sole in which use is made of material originating from discarded tyres. Likewise, the invention relates to a method for manufacturing shoes incorporating an outer sole such as the one just indicated.

BACKGROUND OF THE INVENTION

In the past, shoe manufacture began as a purely craft-oriented activity and, over time, has evolved to reach current industrialisation figures. One of the components of shoes where industrial progress has been greatest is the shoe sole, which is frequently produced by moulding. Examples of manufacturing footwear outsoles in moulds may be found, inter alia, in Spanish Patents Nos. 534,346, 534,783 and 2,007,466. However, there is a general tendency to manufacture shoes following the most conventional and craft-oriented method as far as the production of soles is concerned, since manual assembly of the different components gives the shoe characteristics of comfort and flexibility, which is unusual in the industrial processes used nowadays. In fact, it should be stated that the craft-oriented production of shoes has virtually died out.

On the other hand, recent times have seen a strong ecological/naturist trend in society and increasing concern about "synthetic" waste products which cannot be absorbed naturally, with a search for substitutes for these in the form of biodegradable-type materials.

In the field mentioned above, the Applicant has directed its research work towards the production of shoes using more "natural" raw materials, not forgetting the guarantees and performance levels contributed by new technologies, to which end use is made of naturally tanned skins, such as hand-oiled American pull or oiled flesh split, noble metals such as brass for eyelet holes, leather lining, leather middle soles, etc. Logically, synthetic materials, such as EVA or synthetic counters, affording greater reliability in terms of strength, solidity and comfortable fit of the shoe, are combined with these materials.

Likewise, the Applicant provides the major innovation of using used tires for producing the outer sole of the shoes, so continuing old attempts such as described in French Patents Nos. 935,251, 967,459 and 1,016,956, but essentially improving them in respect of the technology which has been developed in order to obtain better results than before.

SUMMARY OF THE INVENTION

Consequently, one subject of the invention consists in a method for manufacturing outer shoe soles from used tires, in which, after preparatory work which is certainly laborious, a product is finally obtained which is surprising in terms of its performance levels and comfortable fit.

A further subject of the invention consists in a method for manufacturing shoes using the outer sole mentioned above, in which the shoe is presented with two different versions of skin, i.e., on the one hand, the hand-oiled American pull, which provides a soft texture, flexibility and comfort, and, on the other hand, the oiled flesh split, with which it is endeavoured to create the image of a basic product. With both materials, an attempt is made to find the shoe's "natural" and "aged" image, which definitively provides an "original" image, it also being possible to combine both categories of skins.

Lastly, further subjects of the invention are both the outer sole and the shoe obtained by means of the above-mentioned methods.

DETAILED DESCRIPTION OF THE INVENTION

Figure 1:
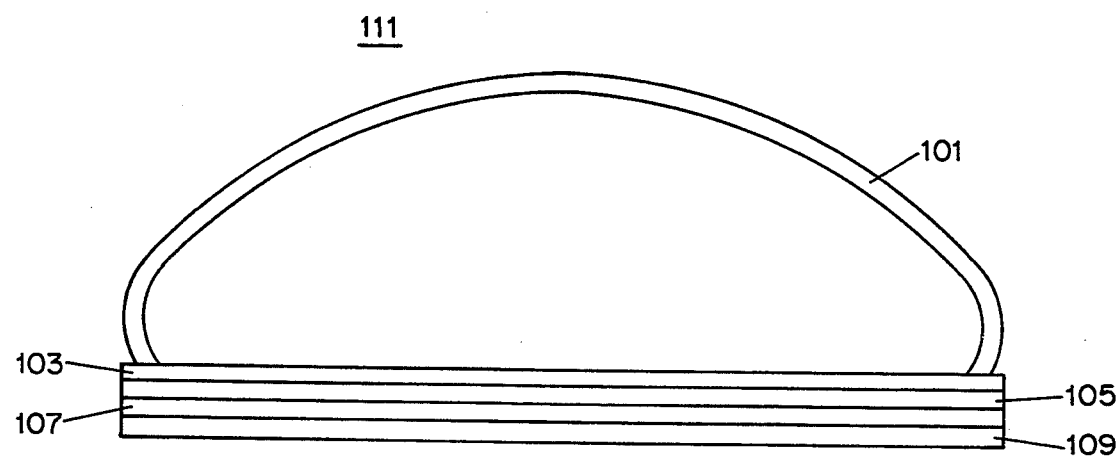
FIG. 1 illustrates a cross-section of a shoe in accordance with the invention.

The method for manufacturing outer shoe soles in accordance with the invention consists in using used tires originating from all over the world, particularly from Europe, and equipped with an inner weaving of textile material, preferably cotton. To this end, the tire is cut in half, following its diameter, and sidewalls are freed from the sides, these being used for making the outsole or outer sole. Next, the resulting cut tire is placed in a machine which removes the inner part of the tire, that is to say the surface in contact with the inner tube, thereby leaving the exposed weaving, this weaving being the material which is to be used. Once the weaving has been revealed, the cut tire is placed in a shaving machine, where the two faces are smoothed in order to even out the surface and achieve a suitable mean thickness, particularly a thickness of 6.5 to 7 mm. Once the surface and the thickness have been evened out, the sole is punched out so it takes on the definitive shape. The final work to be carried out in order to be able to say that the sole is ready for assembly with the other components is to fix the shape since, as may be imagined, from the start of the entire process the material retains the circular shape originally possessed by the tire. For this reason, the punched-out soles are placed in a press where, after applying pressure and heat to them, they are definitively shaped and suitable for being assembled with the remaining components.

Referring to FIG. 1 once the outer 109 has been obtained in the manner indicated above, the next step is the manufacture of the shoe 111 which, apart from the said sole 109, includes a leather upper 101, a leather insole 103, a microporous EVA middle sole 105, a steel reinforcement 107 and a microporous EVA heel wedge, the EVA preferably being black in colour. To this end, the leather insole 103 and the microporous middle sole 105 are punched out, and these components are glued together with the application of pressure in order to ensure they are glued together. Once the leather insole 103 and the microporous middle sole 105 are completely glued together, they are then sewn to the upper 101 of the shoe, the upper 101 and the middle sole 105, sewn together, at this point constituting a single entity. Next, the microporous middle sole 105 is treated with glue and the steel reinforcement 107 is applied, starting from the centre of the heel and extending as far as the toe, this reinforcement being approximately 10 cm long and guaranteeing the non-deformability of the shape of the shoe after its continuous use. Once the glue has dried and the reinforcement has been fixed, the shoe is ready for assembly with the final part of the sole 109, for which purpose, in a separate process, glue is applied to the microporous wedge with the tire sole, using, for this, the normal process of treating with glue by means of heat and pressure. Once the said two parts, that is to say the leather upper 101, leather insole 103, microporous middle sole 105 and reinforcement on the one hand, and microporous wedge and tire sole on the other hand, have been prepared separately, the final operation of treating with glue is carried out, for which purpose glue is applied to both parts, the glue is reactivated by means of heat and both parts are assembled together by means of pressing the upper 101 against the sole. When it has been confirmed that there is perfect adhesion between the two parts, the periphery of the entire sole is smoothed (trimmed) in order to level it and give it a definitive appearance and finish.

The shoe 111 thus obtained may be marketed directly in most cases, since these shoes require no special type of finish either on the leather or on the edge of the sole, the finish being completely natural. Only in the case of a leather colour of brown pull type is it necessary to perform finishing on the edge of the sole in order to reduce the contrast between the colour of the edge of the middle sole 105 and the reddish colour of the leather.

The shoes in accordance with the invention may have embellishments such as brass eyelet holes with an old-copper finish, assembled wrong-side out in order to avoid, with the use of this material, the possibility of rusting. The inner insole 103 may be made from the same leather as the upper 101 of the shoe and the laces may also be made from leather.

The material of the counters of the leather upper 101 of the shoe 111 preferably consists of a mixture of synthetic fibre and cotton treated with heat and glue. The heel counter may be lined with pigskin since this material guarantees perfect fixing. In fact, as is known, when working with especially oily skins, it is necessary to check the adhesive nature of the glue and, in this manner, dispense with sewing and outsole stitching, which are usually a source of problems.

The yarns used in the shoe 111 of the invention are of two types, namely cotton trimming yarn for fastening to the sole and natural adornments, and matching polyamide/nylon yarn for everything connected with the construction of the shoe 111. It should be noted that passes of trimming yarn are carried out before the stage of constructing the shoe 111, with the result that there are none of the typical internal seams/knots which are usually so troublesome. The use of nylon in the construction guarantees solidity and security.

The manufacture of shoes in accordance with the invention provides, on the one hand, the advantage that use is made of recovered tire material and, on the other hand, the advantage that the outer sole 109 of the shoe consists of a sole fabricated using craft methods, piece by piece, with the result that no two soles and, therefore, no two shoes are identical. All this, combined with the fact that the shoes are produced using the "stitch down" manufacturing system and with the strict control of the production passes (punching out the various pieces of leather, marking eyelet holes, sewing, etc., branding, construction and sewing, mounting of toepuffs and counters, lasting with middle sole and adjustment/cutting of the leather, oven for fixing the last, treating middle sole and sole with size, fastening of the sole, smoothing/trimming, cleaning and first quality control (in series production), finishing, laces/ties and packaging, quality control, fitting, labelling, coding, etc.), means that a product is provided which meets market requirements in terms of up-to-date appearance, durability, comfort and flexibility of the shoe.

PREFERRED EMBODIMENT OF THE INVENTION

A shoe was manufactured whose sole included the following components:

Leather insole with a thickness of from 2.5 to 3 mm
Microporous black EVA middle sole with a thickness of 3 mm
Steel reinforcement with a length of 10 cm
Microporous black EVA wedge with a thickness of 9 mm
Outer sole made from recycled tire with a thickness of from 6.5 to 7 mm.

The leather insole was glued to the black EVA middle sole and the assembly, glued to the upper of the shoe, was sewn. Next, the steel reinforcement was glued to the microporous middle sole. Separately, the black EVA wedge was glued to the outer tire sole and the assembly thus obtained was glued to the previous assembly consisting of the leather upper, the leather insole, the microporous middle sole and the reinforcement. A shoe with excellent performance levels and comfortable fit was thus obtained.

The Applicant deems that the essential characteristics of the invention have been adequately presented in the above text. However, it is aware that modifications of detail could be made without departing from the spirit and scope of the invention. Therefore, it is claimed that the scope of the latter is defined solely by the content of the following claims.

I claim:

1. Method for manufacturing shoes comprising the steps of:

cutting the tire to remove therefrom at least a sidewall for material which can be used for fabricating an outer shoe sole having an upper face and a lower ground engaging face;

shaving the inner surface of the sidewall until the weaving of textile material is revealed;

smoothing two faces of the sidewall in order to even out said two faces, and leaving partially visible an area of the textile material on one of said faces, said one of said faces constituting the lower face of the outer shoe sole;

punching out of the sidewall a definitive shape of the outer sole;

pressing and applying heat to said sole;

punching out a leather insole and a microporous middle sole and attaching these elements together to form an inner sole assembly;

sewing the inner sole assembly to an upper of the shoe so that these two elements constitute a single entity;

attaching a steel reinforcement to the microporous middle sole;

attaching a wedge, which shapes the heel of the shoe, to the outer sole to form an outer sole assembly;

attaching the single entity to the outer sole assembly;

applying heat and pressure to the single entity and the outer sole assembly; and trimming the periphery of the entire sole in order to level it and give it a definitive appearance and finish.

2. Shoe obtained by means of the method of claim 1.

* * * * *